US 9,568,110 B2
Helfer (45) Date of Patent: *Feb. 14, 2017

(54) VALVE SEALS

(71) Applicant: Fisher Controls International LLC, Marshalltown, IA (US)

(72) Inventor: Wade Jonathon Helfer, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/331,814

(22) Filed: Jul. 15, 2014

(65) Prior Publication Data

US 2014/0319399 A1 Oct. 30, 2014

Related U.S. Application Data

(63) Continuation of application No. 13/271,873, filed on Oct. 12, 2011, now Pat. No. 8,814,138.

(51) Int. Cl.
*F16K 1/226* (2006.01)
(52) U.S. Cl.
CPC .................. *F16K 1/2266* (2013.01)
(58) Field of Classification Search
CPC ......................... F16K 1/226–1/2268
USPC ........ 251/332–334, 305–308, 359–363, 174, 251/180, 192, 317
See application file for complete search history.

(56) References Cited

U.S. PATENT DOCUMENTS

| 3,065,950 | A | * | 11/1962 | Goldberg | F16K 1/24 251/85 |
| 3,076,631 | A | * | 2/1963 | Grove | F16K 1/22 137/242 |
| 3,250,510 | A | | 5/1966 | Williams | |
| 3,263,961 | A | * | 8/1966 | Varga | F16K 1/42 251/332 |
| 3,379,408 | A | * | 4/1968 | Lowrey | F16K 5/0684 251/298 |
| 3,650,508 | A | | 3/1972 | Kosmala et al. | |
| 4,113,268 | A | * | 9/1978 | Simmons | F16K 1/2266 137/72 |

(Continued)

FOREIGN PATENT DOCUMENTS

| EP | 0160828 | 11/1985 |
| JP | S54-153334 | 12/1979 |
| JP | S56-70262 | 6/1981 |

OTHER PUBLICATIONS

Patent Cooperation Treaty, "International Search Report," issued in connection with Application No. PCT/US/2012/059513, Jan. 2, 2013, 3 pages.

(Continued)

*Primary Examiner* — John Bastianelli
(74) *Attorney, Agent, or Firm* — Hanley, Flight & Zimmerman, LLC

(57) ABSTRACT

Valve seals are described. An example seal for use in a valve includes a ring-shaped cartridge having a first portion, a second portion opposite the first portion, and a compressible sealing portion between the first and second portions. The first and second portions have respective first and second curved surfaces adjacent a sealing surface of the compressible sealing portion. The first and second curved surfaces enable a flow control member to compress the sealing portion prior to contacting the curved surfaces as the flow control member transitions to a closed position.

15 Claims, 4 Drawing Sheets

(56) References Cited

U.S. PATENT DOCUMENTS

| | | | |
|---|---|---|---|
| 4,162,782 A | | 7/1979 | Wilkins |
| 4,272,054 A | | 6/1981 | Zinnai |
| 4,293,116 A | | 10/1981 | Hinrichs |
| 4,341,233 A | | 7/1982 | Broadway |
| 4,396,199 A | * | 8/1983 | Boyd .................. F16K 1/2263 251/173 |
| 4,623,121 A | | 11/1986 | Donnelly |
| 5,377,954 A | | 1/1995 | Adams et al. |
| 6,796,545 B2 | * | 9/2004 | Enzaki .................. F16J 15/062 251/317 |
| 2007/0138429 A1 | | 6/2007 | Hutchens et al. |
| 2007/0215834 A1 | | 9/2007 | Helfer et al. |
| 2008/0073612 A1 | | 3/2008 | Day |
| 2013/0092859 A1 | | 4/2013 | Helfer |

OTHER PUBLICATIONS

Patent Cooperation Treaty, "Written Opinion of the International Searching Authority," issued in connection with Application No. PCT/US2012/059513, Jan. 2, 2013, 6 pages.

United States Patent and Trademark Office, "Notice of Allowance," issued in connection with U.S. Appl. No. 13/271,873, mailed Apr. 15, 2014, 28 pages.

Japanese Patent Office, Notice of Reasons for Refusal, issued in connection with the Japanese Patent Application No. 2014-535811, mailed Aug. 10, 2016, 12 pages.

* cited by examiner

VALVE SEALS

RELATED APPLICATION

This patent arises from a continuation of U.S. application Ser. No. 13/271,873, which was filed on Oct. 12, 2011 and is hereby incorporated herein by reference in its entirety.

FIELD OF THE DISCLOSURE

This disclosure relates generally to valves and, more particularly, to seals for use in valves.

BACKGROUND

Valves are often used to control fluids in industrial processes. Process conditions such as temperatures and pressures generally dictate the type of seal that may be used in a valve. In high temperature conditions, metal seals are often used because softer, non-metallic seals (e.g., a polytetrafluoroethylene seal) may sublimate or burn when exposed to temperatures exceeding 450 degrees Fahrenheit. However, metal seals typically cannot achieve tight shutoff (e.g., ANSI Class VI shutoff). A valve with a triple offset design may achieve tight shutoff when exposed to high temperatures by using a seal containing a graphite laminate material, but a triple offset valve requires an expensive, large actuator to drive a flow control member (e.g., a disk) in the valve.

SUMMARY

An example seal for use in a valve includes a ring-shaped cartridge having a first portion, a second portion opposite the first portion, and a compressible sealing portion between the first and second portions. The first and second portions have respective first and second curved surfaces adjacent a sealing surface of the compressible sealing portion. The first and second curved surfaces enable a flow control member to compress the sealing portion prior to contacting the curved surfaces as the flow control member transitions to a closed position.

Another example seal for use in a valve includes a ring-shaped cartridge having a first portion and a second portion. The first and second portions hold a sealing portion. The first and second portions have respective first and second curved surfaces adjacent a sealing surface of the sealing portion. The first and second curved surfaces have respective first and second radii of curvature to enable an initial point of contact between a flow control member and the cartridge to be on the sealing surface when the flow control member moves to a closed position.

Another example seal for use in a valve includes means for holding means for sealing. The means for holding has first and second means for enabling a flow control member to contact the means for sealing prior to contacting the means for holding as the flow control member transitions to a closed position. The first and second means for enabling contact are adjacent the means for sealing.

DETAILED DESCRIPTION

Figure 1:
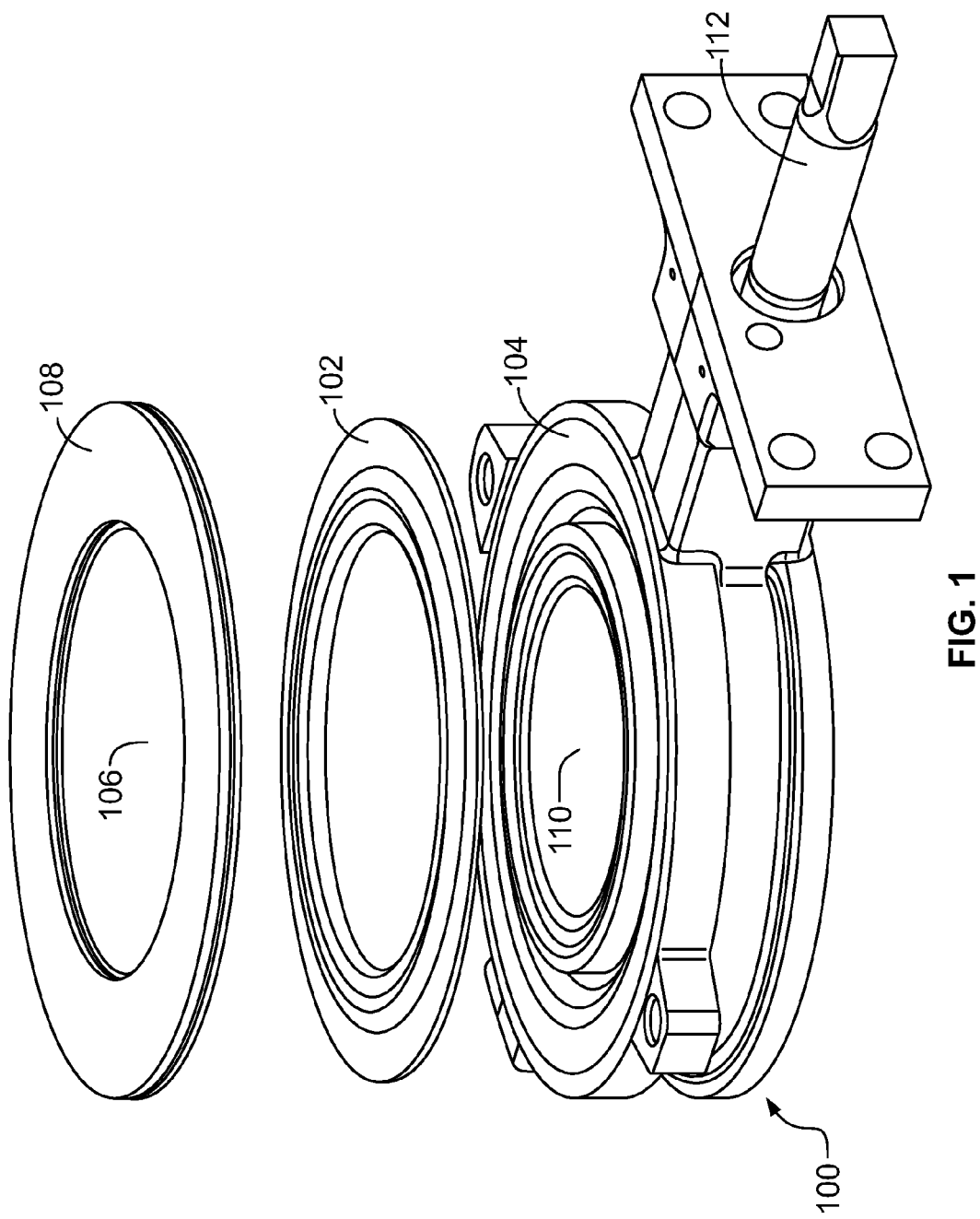
FIG. 1 is a partially exploded view of a butterfly valve including an example seal.

While the following example seals are described in conjunction with butterfly valves, the example seals may also be used in any other rotary valve (e.g., ball valves, Fisher® Vee-Ball™ Rotary Control Valves, etc.). In industrial processes, such as oil and gas distribution systems and chemical processing plants, fluids are often controlled using valves (e.g., butterfly valves, ball valves, etc.). Typically, the shutoff capabilities of the valves affect the performance and operation of the industrial process. Generally, a valve cannot achieve tight shutoff (e.g., ANSI Class VI shutoff) without a soft (e.g., elastomeric) seal. However, process conditions typically dictate the type of seals that may be used in the valves. For example, a polytetrafluoroethylene (PFTE) seal, which may enable a valve to achieve tight shutoff, may burn and/or sublimate if exposed to temperatures above 450 degrees Fahrenheit. Therefore, PFTE seals are generally not suitable for high temperature applications. Metal seals, on the other hand, can normally withstand high temperatures, so metal seals are traditionally used in valves that are exposed to high temperatures. However, generally, a metal seal cannot achieve tight shutoff. Further, the sealing performance of a metal seal typically declines when the seal is cooled from an elevated temperature to an ambient temperature. As a result, a valve with a metal seal exposed to high operating temperatures may leak excessively when the valve is cooled to an ambient temperature, thereby affecting the performance and operation of the industrial process and hindering routine valve maintenance.

A valve with a triple offset design may achieve tight shutoff in high temperature applications by using a seal made of a graphite laminate material. Generally, the seal in a triple offset valve is coupled to a flow control member, and the seat is integral to the valve body. To achieve tight shutoff, the flow control member is driven into the valve body using an actuator that is typically larger and more expensive than actuators used with other valve designs.

The example seal described herein may provide tight shutoff (e.g., Class VI shutoff) at high temperatures throughout the lifetime of the example seal. Also, the example seal may maintain tight shutoff when the valve is cooled from a high temperature to an ambient temperature. An example seal includes a ring-shaped cartridge having a first portion and a second portion opposite the first portion. The first portion and the second portion hold a sealing portion. The first and second portions have respective first and second curved surfaces adjacent to a sealing surface of the sealing portion. The first and second curved surfaces enable an initial point of contact between a flow control member and the cartridge to be on the sealing surface when the flow control member moves to a closed position. The radii of curvature of the curved surfaces provide a first clearance between the flow control member and the first portion and a second clearance between the flow control member and the second portion when the flow control member initially contacts the sealing surface.

The sealing portion may be compressible. In an example seal with a compressible sealing portion, the first and second curved surfaces enable the flow control member to compress the sealing portion prior to contacting the first curved surface or the second curved surface when the flow control member moves to a closed position. When the flow control member is in the closed position, the sealing portion compresses such that the sealing portion and at least one of the curved surfaces sealingly engages the flow control member. During a lifetime of an example seal, the sealing portion wears to a worn condition. When the sealing portion is in the worn condition, the flow control member still contacts the sealing surface prior to contacting the first curved surface or the second curved surface. However, when the flow control member is in the closed position, the first curved surface, the sealing surface, and the second curved surface sealingly engage the flow control member.

FIG. 1 is a partially exploded view of a butterfly valve 100 including an example seal 102. The butterfly valve 100 shown in FIG. 1 may be exposed to a wide range of temperatures and pressures while controlling process fluids. The valve 100 includes a valve body 104 defining a fluid flow passageway 106 having an inlet and an outlet. A ring-shaped retainer 108 is coupled to the valve body 104 to retain the example seal 102. A flow control member 110 (e.g., a disk, ball, etc.) is disposed within the fluid flow passageway 106. The flow control member 110 is operatively coupled to a driveshaft 112, which rotates the flow control member 110 from a first position (e.g., an open position) to a second position (e.g., a closed position). The flow control member 110 shown in FIG. 1 is in a substantially closed position to form a fluid seal between the flow control member 110 and the example seal 102.

Figure 2:
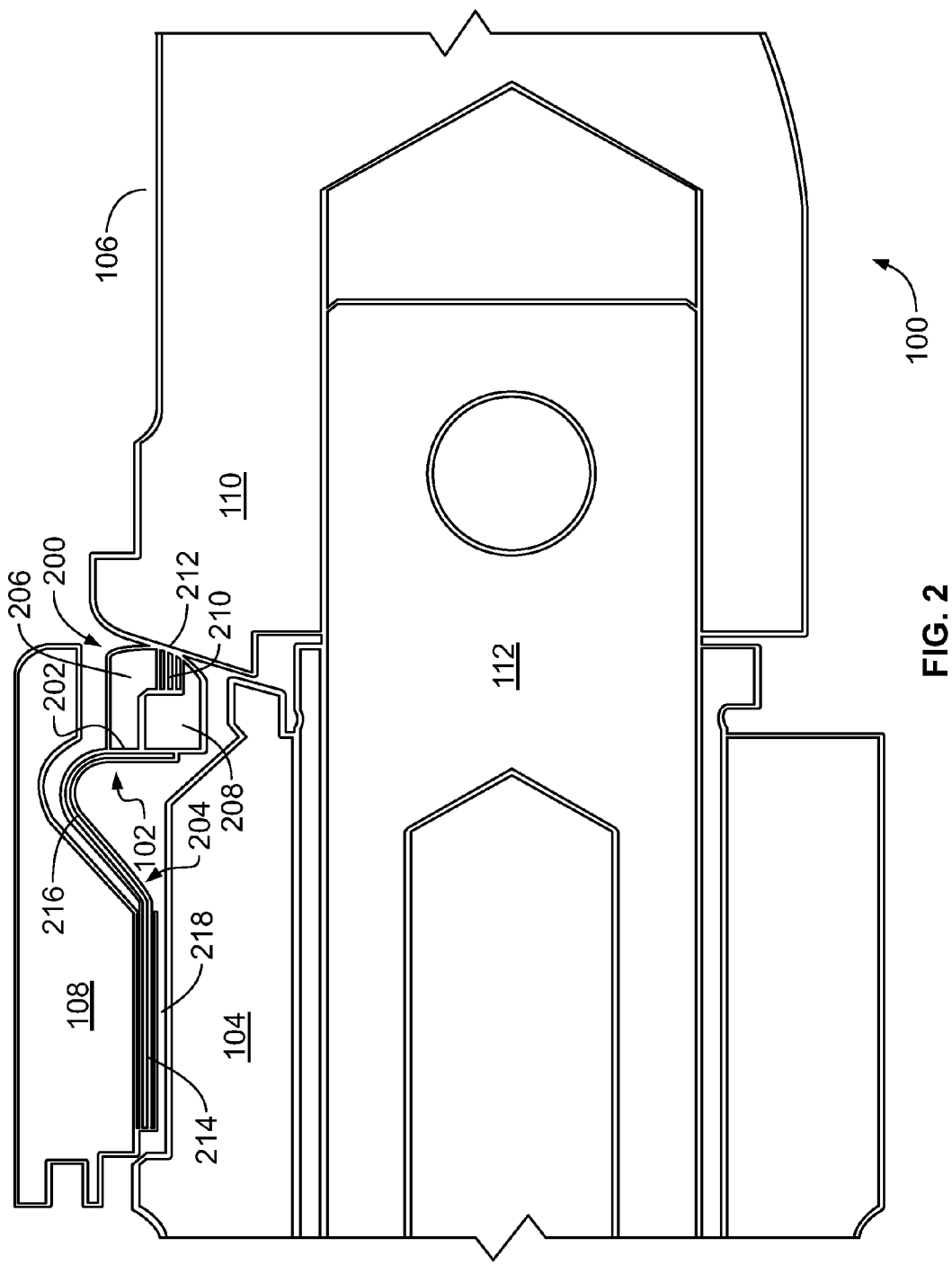
FIG. 2 is a cross-sectional view of a portion of the butterfly valve of FIG. 1.

FIG. 2 is a cross-sectional view of the butterfly valve 100 including the example seal 102. The example seal 102 described herein includes a ring-shaped cartridge 200 coupled (e.g., laser welded or mechanically, metallurgically, and/or chemically fastened) to an inner circumferential surface 202 of a substantially flexible, ring-shaped carrier 204. When the flow control member 110 moves to a closed position, the flow control member 110 contacts the cartridge 200, which causes the carrier 204 to deflect. The cartridge 200 is positioned on the inner circumferential surface 202 of the carrier 204 such that the cartridge 200 does not contact the seal retainer 108 or the valve body 104 when the carrier 204 deflects during operation. The cartridge 200 includes a first portion 206 and a second portion 208 opposite the first portion 206. The first portion 206 and the second portion 208 hold a ring-shaped sealing portion 210. The first portion 206 may be coupled (e.g., via a weld, adhesive, or any suitable fastener) to the second portion 208 to define a cavity to receive the sealing portion 210. In the example seal 102 shown in FIGS. 1 and 2, the sealing portion 210 is captured between the first and second portions 206 and 208. As described in greater detail below, when the flow control member 110 moves to a closed position, an initial point of contact 400 (FIG. 4) between the flow control member 110 and the cartridge 200 is on a sealing surface 212 of the sealing portion 210.

In the cross-sectional view of FIG. 2, the carrier 204 has a flanged portion 214 with a straight profile and a flexible portion 216 with a curved profile. The curved profile of the flexible portion 216 imparts flexibility to the carrier 204. However, any other profile or shape that imparts flexibility to the carrier 204 may be used. The flexible portion 216 of the carrier 204 provides a spring force against the flow control member 110 and enables the example seal 102 to follow the flow control member 110 and maintain a fluid seal when the flow control member 110 in a closed position moves or deflects due to a change in a process condition such as a large pressure drop.

A preload gap 218 exists between the carrier 204 and the valve body 104 to affect a spring force provided by the carrier 204 when the flow control member 110 is driven into the seal 102. For example, an increase in the preload gap 218 increases the spring force provided by the carrier 204. The spring force provided by the carrier 204 against the flow control member 110 enables a fluid seal to form between the example seal 102 and the flow control member 110 as the flow control member 110 moves to a closed position. Two gaskets (not shown) are coupled (e.g., glued) to the flanged portion 214 of the carrier 204 to create a static seal to prevent process fluid from escaping between the valve body 104 and the valve retainer 108.

Figure 3:
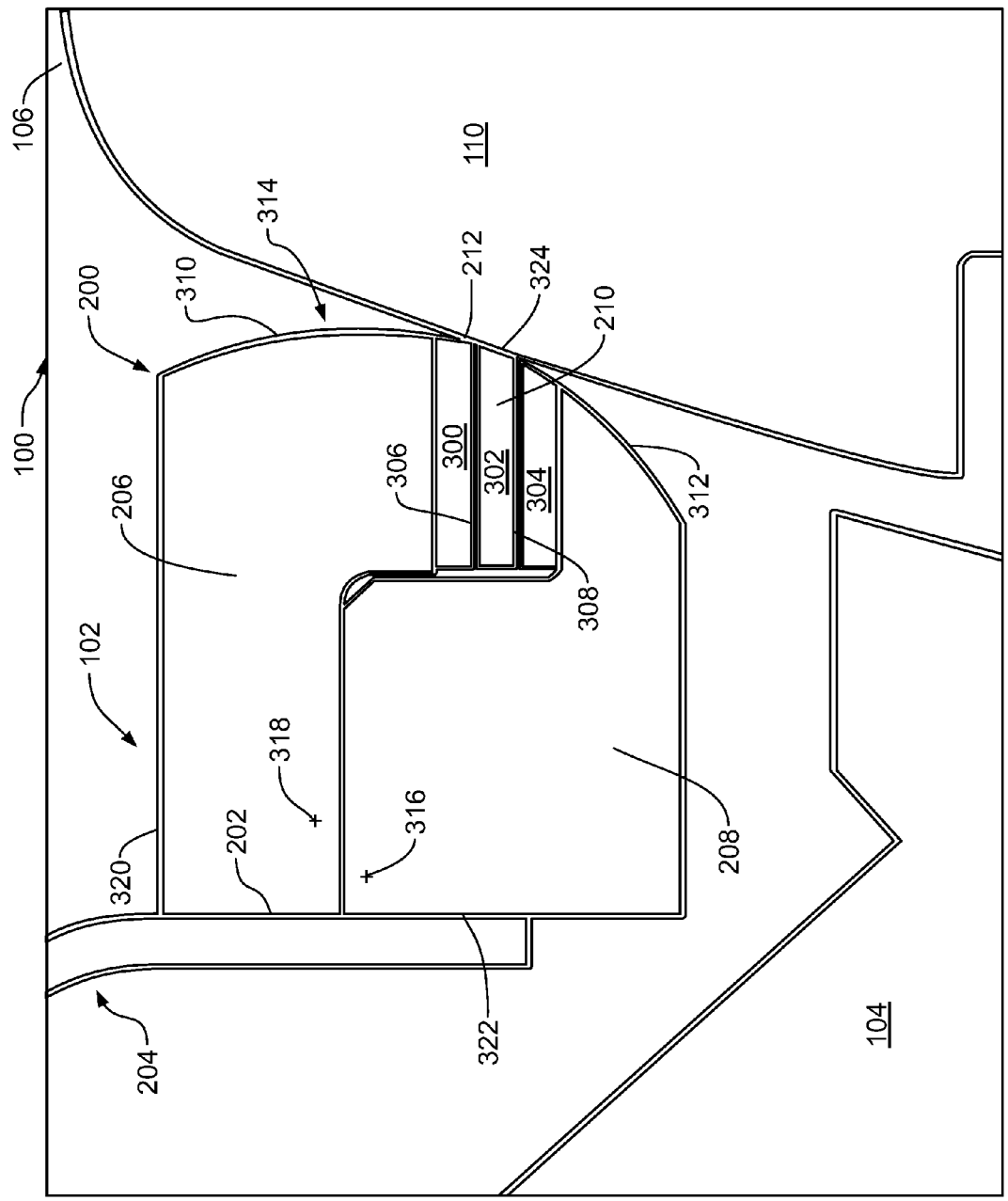
FIG. 3 is an enlarged, cross-sectional view of an example cartridge used with the example seal of FIG. 1.

FIG. 3 is an enlarged, cross-sectional view of an example cartridge 200 included in the example seal 102 of FIG. 1. The first portion 206 and the second portion 208 are made of metal (e.g., stainless steel) to provide rigidity to the cartridge 200. The sealing portion 210 includes three layers 300, 302 and 304 made of a compressible material (e.g., graphite laminate) separated by metal (e.g., stainless steel) foil layers 306 and 308, which prevent adhesion and/or transfer of the compressible layers 300, 302 and 304 to the flow control member 110. As discussed in greater detail below, the flow control member 110 compresses the sealing portion 210 prior to contacting the first portion 206 or the second portion 208 when the flow control member 110 moves to a closed position.

In the cross-sectional view of FIG. 3, the first portion 206 and the second portion 208 are substantially polygonal-shaped. The first portion 206 has a first curved surface 310 and the second portion 208 has a second curved surface 312. The first curved surface 310 and the second curved surface 312 are oriented to face the fluid flow passageway 106. Further, the first and second curved surfaces 310 and 312 are adjacent and substantially contiguous to the sealing surface 212, which is also oriented to face the fluid flow passageway 106. The sealing surface 212 of the sealing portion 210 is also curved. Thus, the first curved surface 310, the second curved surface 312, and the sealing surface 212 form a convex, inner circumferential surface 314 of the cartridge 200, which defines an inner diameter of the example seal 102.

The radius of curvature of the first curved surface 310 is greater than a radius of curvature of the second curved surface 312. In the cross-sectional view of the example cartridge 200 shown in FIG. 3, the radius of curvature of the first curved surface 310 is 0.242 inches, and the radius of curvature of the second curved surface 312 is 0.306 inches. Centers of curvature 316 and 318 of the first curved surface 310 and the second curved surface 312 are 0.099 inches and 0.075 inches, respectively, from an outer surface 320 of the first portion 206 lateral to the first curved surface 310. The center 316 of the first curved surface 310 is 0.048 inches farther from an outer circumferential surface 322 of the cartridge 200 than the center 318 of the second curved surface 312. The above-noted dimensions are merely one example and, thus, other dimensions may be used without departing from the scope of this disclosure.

The sealing surface 212 is also curved and has a first radius of curvature and a second radius of curvature, which have centers coincident with the centers 316 and 318 of the first curved surface 310 and the second curved surface 312, respectively. Also, the radii of curvature of the sealing surface 212 are substantially equal to the radii of the first and second curved surfaces 310 and 312, respectively. Thus, the portion of the sealing surface 212 having the first radius of curvature is adjacent to the first curved surface 310 and the portion of the sealing surface 212 having the second radius of curvature is adjacent to the second curved surface 312. In the orientation of FIG. 3, a midpoint 324 of the sealing surface 212 is located at the intersection of the first and second radii of curvature of the sealing surface 212 to enable the sealing surface 212 to be along the path of the flow control member 110 such that the flow control member 110 contacts the sealing surface 212 prior to contacting the first curved surface 310 or the second curved surface 312 when moving to a closed position. As discussed in greater detail below, the first and second curved surfaces 310 and 312 enable the flow control member 110 to compress the sealing portion 210 prior to contacting the first portion 206 or the second portion 208 to form a fluid seal achieving tight shutoff (e.g., ANSI Class VI shutoff).

Figure 4:
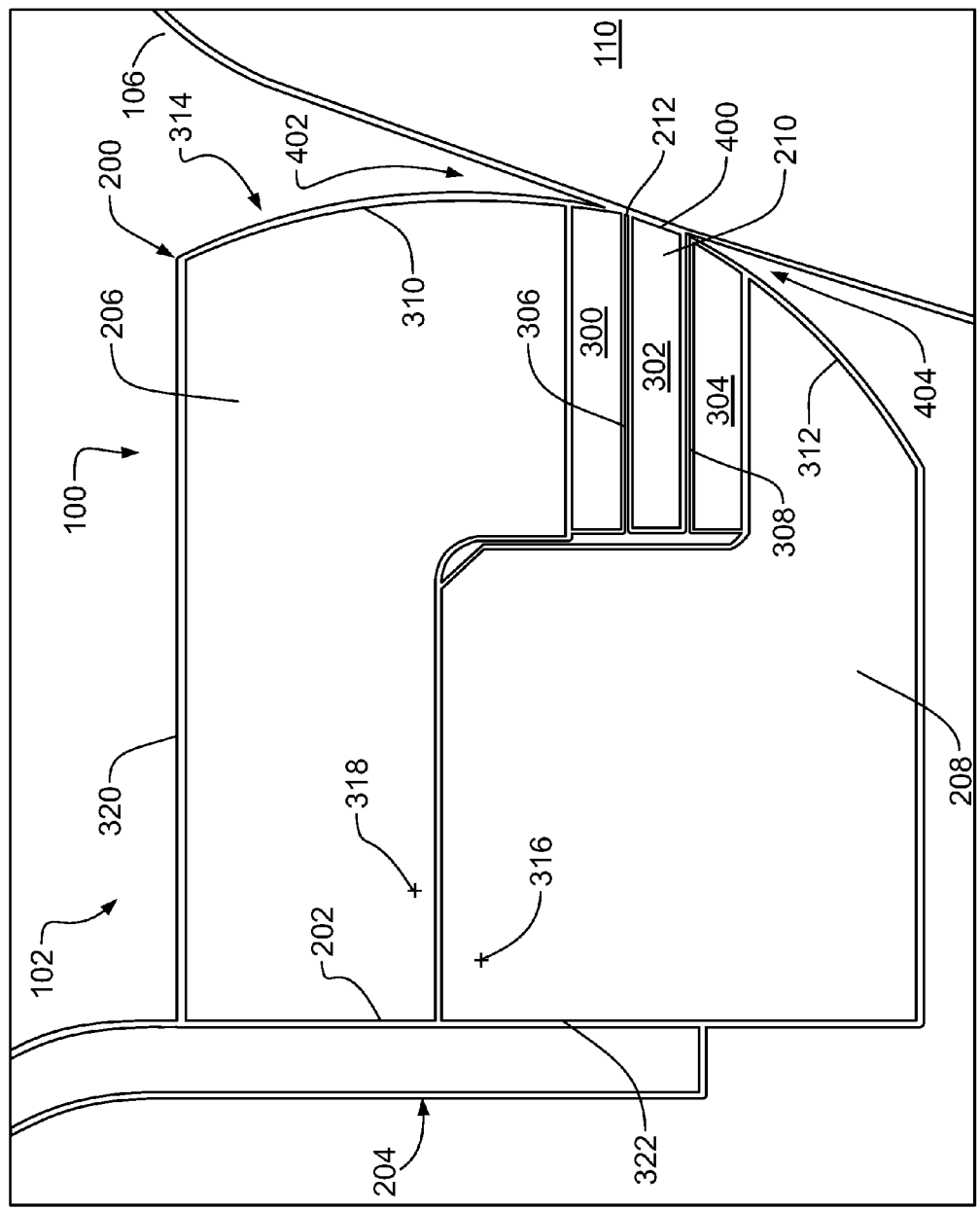
FIG. 4 is an enlarged, cross-sectional view of the example seal of FIG. 1 depicting an initial point of contact between a flow control member and the example seal.

FIG. 4 depicts an enlarged cross-sectional view of the flow control member 110 contacting the example seal 102 of FIG. 1. As shown in FIG. 4, the radii of curvature of the first and second curved surfaces 310 and 312 enable the initial point of contact 400 between the flow control member 110 and the cartridge 200 to be on the sealing surface 212 when the flow control member 110 moves to a closed position. When the flow control member 110 initially contacts the sealing surface 212, the radii of curvature of the first and second curved surfaces 310 and 312 provide a first clearance 402 between the flow control member 110 and the first portion 206 and a second clearance 404 between the flow control member 110 and the second portion 208. The second clearance 404 may be at least twice as large as the first clearance 402. In the example seal 102 shown in FIG. 4, the first clearance 402 is 0.004 inches, and the second clearance 404 is 0.008 inches. However, other clearances may be used without departing from the scope of this disclosure. In addition, the radii of curvature of the first curved surface 310 and the second curved surface 312 enable the respective first portion 206 and second portion 208 to sufficiently support and grip the sealing portion 210 to prevent the sealing portion 210 from significantly distorting in response to a fluid flow. If the radii of curvature of the first and second curved surfaces 310, 312 are too small, the first portion 206 and the second portion 208 may not sufficiently support and grip the sealing portion 210 to prevent the sealing portion 210 from significantly distorting in the direction of the fluid flow.

After the flow control member 110 contacts the sealing surface 212, the carrier 204 deflects as the flow control member 110 continues to move toward a closed position. The spring force provided by the carrier 204 opposing the force of the flow control member 110 moving into the closed position causes the sealing portion 210 to compress against the flow control member 110, thereby forming a fluid seal between the sealing surface 212 and the flow control member 110. The compression of the sealing portion 210 enables the seal 102 to achieve tight shutoff (e.g., ANSI Class VI shutoff) between the seal 102 and the flow control member 110.

When the flow control member 110 reaches the closed position, the flow control member 110 sealingly engages the sealing surface 212 and at least one of the curved surfaces 310 and 312. In the example seal 102 shown in FIG. 4, the flow control member 110 compresses the sealing portion 210 and sealingly engages the sealing surface 212 and the first curved surface 310 when the flow control member is in the closed position.

During the lifetime of an example seal 102 described herein, the flow control member 110 may seat and unseat against the sealing surface 212 tens of thousands of times. Eventually, the sealing portion 210 wears to a worn condition. As a result, the initial point of contact 400 between the flow control member 110 and the cartridge 200 moves along the inner circumferential surface 314 of the cartridge 200. However, the first and second curved surfaces 310 and 312 enable the initial point of contact 400 between the flow control member 110 and the cartridge 200 to remain on the sealing surface 212 throughout the lifetime of the seal 102. Therefore, although the first and second clearances 402 and 404 may decrease as the sealing portion 210 wears, the first curved surface 310 and the second curved surface 312 enable the flow control member 110 to avoid contacting the first and second portions 206 and 208 until the flow control member 110 sealingly engages the sealing surface 212.

When the flow control member 110 is in the closed position and the sealing portion 210 is in a worn condition, the flow control member 110 compresses the sealing portion 210 and sealingly engages the sealing surface 212 and the first and second curved surfaces 310 and 312. Thus, the flow control member 110 may sealingly engage the sealing portion 210 to enable an example seal 102 to achieve tight shutoff (e.g., Class VI shutoff) in high temperature applications throughout the lifetime of the example seal 102. Also, the example seal 102 may not have to rely on a secondary sealing surface, and no portion of the example seal 102 may be sacrificial. In addition, the example seal 102 may maintain tight shutoff when the example seal 102 is cooled from a high temperature to an ambient temperature.

Although certain example apparatus have been described herein, the scope of coverage of this patent is not limited thereto. On the contrary, this patent covers all apparatus fairly falling within the scope of the claims of this patent.

What is claimed is:

1. A seal for use in a valve, comprising:
   a ring-shaped cartridge having a first portion, a second portion opposite the first portion, and a compressible sealing portion between the first and second portions, the first and second portions having respective first and second curved surfaces adjacent a sealing surface of the compressible sealing portion, the first and second curved surfaces enabling a flow control member to compress the sealing portion prior to contacting the curved surfaces as the flow control member transitions to a closed position, the sealing surface has a first radius of curvature equal to a radius of curvature of the first curved surface and a second radius of curvature equal to a radius of curvature of the second curved surface.

2. The seal as defined in claim 1, wherein, when the flow control member initially contacts the sealing surface, the first curved surface provides a first clearance between the flow control member and the first portion and the second curved surface provides a second clearance between the flow control member and the second portion.

3. The seal as defined in claim 1, wherein the first radius of curvature of the first curved surface does not equal the second radius of curvature of the second curved surface.

4. The seal as defined in claim 1, wherein the compressible sealing portion includes compressible layers disposed between the first portion and the second portion to define the sealing surface.

5. The seal as defined in claim 4, wherein the compressible sealing portion further includes a foil layer positioned between the compressible layers to further define the sealing surface and to prevent at least one of adhesion or transfer of the compressible layers.

6. The seal as defined in claim 1, wherein the first radius of curvature and the first curved surface share a first center of curvature.

7. The seal as defined in claim 6, wherein the second radius of curvature and the second curved surface share a second center of curvature.

8. A seal for use in a valve, comprising:
a ring-shaped cartridge having a first portion and a second portion, the first and second portions holding a sealing portion, the first and second portions having respective first and second curved surfaces adjacent a sealing surface of the sealing portion, the first and second curved surfaces having respective first and second radii of curvature to enable an initial point of contact between a flow control member and the cartridge to be on the sealing surface when the flow control member transitions to a closed position, a first portion of the sealing surface has the first radius of curvature and a second portion of the sealing surface has the second radius of curvature.

9. The seal as defined in claim 8, wherein the first portion of the sealing surface is adjacent the first portion of the cartridge and the second portion of the sealing surface is adjacent the second portion of the cartridge.

10. A seal for using in a valve, comprising:
a ring-shaped cartridge having a first portion and a second portion, the first and second portions holding a sealing portion, the first and second portions having respective first and second curved surfaces adjacent a sealing surface of the sealing portion, the first and second curved surfaces having respective first and second radii of curvature to enable an initial point of contact between a flow control member and the cartridge to be on the sealing surface when the flow control member transitions to a closed position, the sealing portion is compressible, the sealing portion includes compressible layers and a foil layer positioned between the compressible layers, the compressible layers and the foil layer define the sealing surface of the sealing portion.

11. The seal as defined in claim 10, wherein, when the flow control member initially contacts the sealing surface, the first radius of curvature provides a first clearance between the flow control member and the first portion and the second radius of curvature provides a second clearance between the flow control member and the second portion.

12. The seal as defined in claim 10, wherein the first radius of curvature is different than the second radius of curvature.

13. The seal as defined in claim 10, wherein, when the sealing portion is in a worn condition, at least one of the first curved surface and the second curved surface sealingly engages the flow control member when the flow control member is in the closed position.

14. A seal for use in a valve, comprising:
means for holding means for sealing, the means for holding having first and second means for enabling a flow control member to contact the means for sealing prior to contacting the means for holding as the flow control member transitions to a closed position, the first and second means for enabling contact being adjacent the means for sealing, the first means for enabling contact and the means for sealing define a first radius of curvature and the second means for enabling contact and the means for sealing define a second radius of curvature, the first radius of curvature being different than the second radius of curvature.

15. The seal as defined in claim 14, wherein the means for holding includes means for flexibly coupling the means for holding to a valve.

* * * * *